United States Patent
Lee et al.

(10) Patent No.: US 11,026,123 B2
(45) Date of Patent: *Jun. 1, 2021

(54) METHOD AND DEVICE FOR CONFIGURING SIGNALING CATEGORY FOR ACCESS CONTROL MECHANISM IN WIRELESS COMMUNICATION SYSTEM

(71) Applicant: LG ELECTRONICS INC., Seoul (KR)

(72) Inventors: Youngdae Lee, Seoul (KR); Hyunjung Choe, Seoul (KR); Hongsuk Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 20 days.

This patent is subject to a terminal disclaimer.

(21) Appl. No.: 16/480,663

(22) PCT Filed: Jul. 26, 2018

(86) PCT No.: PCT/KR2018/008460
§ 371 (c)(1),
(2) Date: Jul. 24, 2019

(87) PCT Pub. No.: WO2019/022530
PCT Pub. Date: Jan. 31, 2019

(65) Prior Publication Data
US 2019/0394808 A1    Dec. 26, 2019

Related U.S. Application Data

(60) Provisional application No. 62/537,456, filed on Jul. 27, 2017, provisional application No. 62/537,457, filed on Jul. 27, 2017.

(51) Int. Cl.
*H04W 28/18* (2009.01)
*H04W 60/04* (2009.01)
(Continued)

(52) U.S. Cl.
CPC .......... *H04W 28/18* (2013.01); *H04W 60/04* (2013.01); *H04W 74/004* (2013.01);
(Continued)

(58) Field of Classification Search
CPC  H04W 28/18; H04W 74/004; H04W 74/0833
See application file for complete search history.

(56) References Cited

U.S. PATENT DOCUMENTS 10,397,833  B2    8/2019  Lee et al.
10,764,787  B2 *  9/2020  Lee ................. H04W 76/12
(Continued)

FOREIGN PATENT DOCUMENTS

WO    WO-2018174577 A1 *  9/2018  ........ H04W 74/0833

OTHER PUBLICATIONS

Kim et al., machine translation of WO 2018-174577 A1, Sep. 2018, 45 pages. (Year: 2018).*

(Continued)

*Primary Examiner* — Hoon J Chung
(74) *Attorney, Agent, or Firm* — Lee, Hong, Degerman, Kang & Waimey PC

(57) ABSTRACT

Provided are a method for a user equipment (UE) to perform early data transmission (EDT) in a wireless communication, and an apparatus supporting the same. The method may include: receiving system information including a threshold for the EDT; determining whether or not a condition for initiating the EDT is satisfied, by comparing the threshold for the EDT with a size of data for transmission; if the condition is satisfied, performing the EDT; and if the condition is not satisfied, performing a radio resource control (RRC) connection establishment or resume procedure.

12 Claims, 15 Drawing Sheets

(51) Int. Cl.
*H04W 76/12* (2018.01)
*H04W 74/08* (2009.01)
*H04W 76/27* (2018.01)
*H04W 74/00* (2009.01)

(52) U.S. Cl.
CPC ....... *H04W 74/0833* (2013.01); *H04W 76/12* (2018.02); *H04W 76/27* (2018.02)

(56) References Cited

U.S. PATENT DOCUMENTS

| | | |
|---|---|---|
| 10,772,012 B2* | 9/2020 | Lee .................... H04W 74/004 |
| 2008/0069075 A1 | 3/2008 | Holl |
| 2012/0282889 A1 | 11/2012 | Tanaka et al. |
| 2014/0323124 A1 | 10/2014 | Tanaka et al. |
| 2014/0369297 A1 | 12/2014 | Bertrand et al. |
| 2015/0009958 A1 | 1/2015 | Chang et al. |
| 2017/0245227 A1 | 8/2017 | Jeong et al. |
| 2017/0251516 A1 | 8/2017 | Bangolae et al. |
| 2020/0245362 A1* | 7/2020 | Hoglund ................. H04W 8/24 |

OTHER PUBLICATIONS

PCT International Application No. PCT/KR2018/008460, International Search Report dated Oct. 29, 2018, 2 pages.
Qualcomm, "Early data transmission", 3GPP TSG RAN WG1 Meeting #89, R1-1708800, May 2017, 12 pages.
Zte, "On early data transmission for NB-IoT", 3GPP TSG RAN WG1 Meeting #89, R1-1707096, May 2017, 5 pages.
Huawei, et al., "On early data transmission for NB-IoT", 3GPP TSG RAN WG1 Meeting #89, R1-1708200, May 2017, 5 pages.
Huawei, et al., "On early data transmission for eFeMTC", 3GPP TSG RAN WG1 Meeting #89, R1-1708198, May 2017, 5 pages.
U.S. Appl. No. 16/669,413 , Notice of Allowance dated May 15, 2020, 9 pages.
U.S. Appl. No. 16/506,853, Notice of Allowance dated Apr. 28, 2020, 8 pages.
European Patent Office Application Serial No. 18839014.0, Search Report dated Jun. 19, 2020, 6 pages.
Zte, "Considerations on cIOT optimization for non-NB-IoT," 3GPP TSG-RAN WG2 #93bis, R2-162361, Apr. 2016, 3 pages.
U.S. Appl. No. 16/669,413, Office Action dated Jan. 30, 2020 , 17 pages.
European Patent Office Application Serial No. 18839014.0, Search Report dated Nov. 11, 2019, 9 pages.
Samsung, "Overall procedure for data transfer in inactive state", 3GPP TSG RAN WG2 Meeting #6, R2-168051, Nov. 2016, 6 pages.
Samsung, "Data transfer in Inactive catering different service requirements", 3GPP TSG RAN WG2 Meeting #97, R2-1701527, Feb. 2017, 3 pages.
Via Telecom, "Access Procedure Enhancements for MTC Applications", 3GPP TSG RAN WG2 Meeting #70bis, R2-103968, Jul. 2010, 4 pages.
Qualcomm, "Early data transmission", 3GPP TSG RAN WG1 Meeting #89, R1-1708810, May 2017, 10 pages.
Zte, "On early data transmission for eMTC," 3GPP TSG-RAN WG1 #89, R1-1707097, May 2017, 3 pages.
Zte, "On early data transmission for eMTC," 3GPP TSG-RAN WG1 #90, R1-1713320, Aug. 2017, 4 pages.
Japan Patent Office Application Serial No. 2019-568046, Office Action dated Sep. 8, 2020, 3 pages.

* cited by examiner

METHOD AND DEVICE FOR CONFIGURING SIGNALING CATEGORY FOR ACCESS CONTROL MECHANISM IN WIRELESS COMMUNICATION SYSTEM

CROSS-REFERENCE TO RELATED APPLICATIONS

This application is the National Stage filing under 35 U.S.C. 371 of International Application No. PCT/KR2018/008460, filed on Jul. 26, 2018, which claims the benefit of U.S. Provisional Application No. 62/537,456, filed on Jul. 27, 2017, and 62/537,457, filed on Jul. 27, 2017, the contents of which are hereby incorporated by reference herein in their entirety.

BACKGROUND OF THE INVENTION

Field of the Invention

The present invention relates to a wireless communication system, and more particularly, to a method for a user equipment (UE) to perform early data transmission (EDT) and an apparatus supporting the same.

Related Art

In order to meet the demand for wireless data traffic, which has been increasing since the commercialization of a fourth-generation (4G) communication system, efforts are being made to develop an improved fifth-generation (5G) communication system or pre-5G communication system. For this reason, a 5G communication system or pre-5G communication system is referred to as a beyond-4G-network communication system or post-long-term evolution (LTE) system.

SUMMARY OF THE INVENTION

Meanwhile, for low cost UE, it is important to save UE power. Thus, the number of transmissions should be reduced as many as possible. Early data transmission (EDT) in RRC Connection Establishment or RRC Connection Resume is one of the solutions to reduce UE power consumption. However, the current system does not support early data transmission. Thus, a method for a UE to perform EDT and an apparatus supporting the same need to be proposed.

One embodiment provides a method for performing, by a user equipment (UE), early data transmission (EDT) in a wireless communication. The method may include: receiving system information including a threshold for the EDT; determining whether or not a condition for initiating the EDT is satisfied, by comparing the threshold for the EDT with a size of data for transmission; if the condition is satisfied, performing the EDT; and if the condition is not satisfied, performing a radio resource control (RRC) connection establishment or resume procedure.

Another embodiment provides a user equipment (UE) performing early data transmission (EDT) in a wireless communication. The UE may include: a memory; a transceiver; and a processor, connected to the memory and the transceiver, that: controls the transceiver to receive system information including a threshold for the EDT; determines whether or not a condition for initiating the EDT is satisfied, by comparing the threshold for the EDT with a size of data for transmission; if the condition is satisfied, performs the EDT; and if the condition is not satisfied, performs a RRC connection establishment or resume procedure.

The power consumption of the UE can be reduced.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G communication system is an evolution of the LTE-A.

For clarity, the following description will focus on LTE-A. However, technical features of the present invention are not limited thereto.

Figure 1:
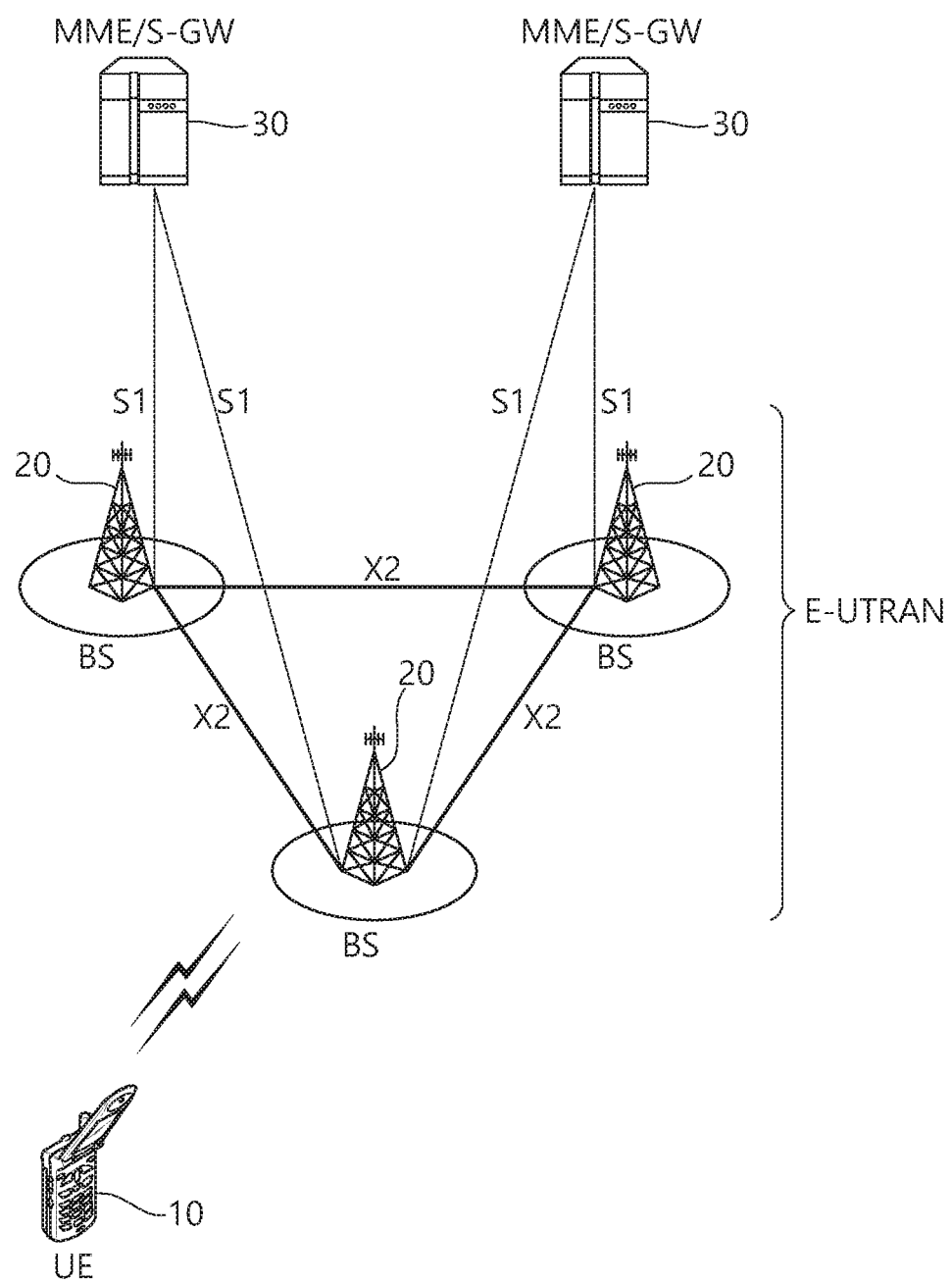
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
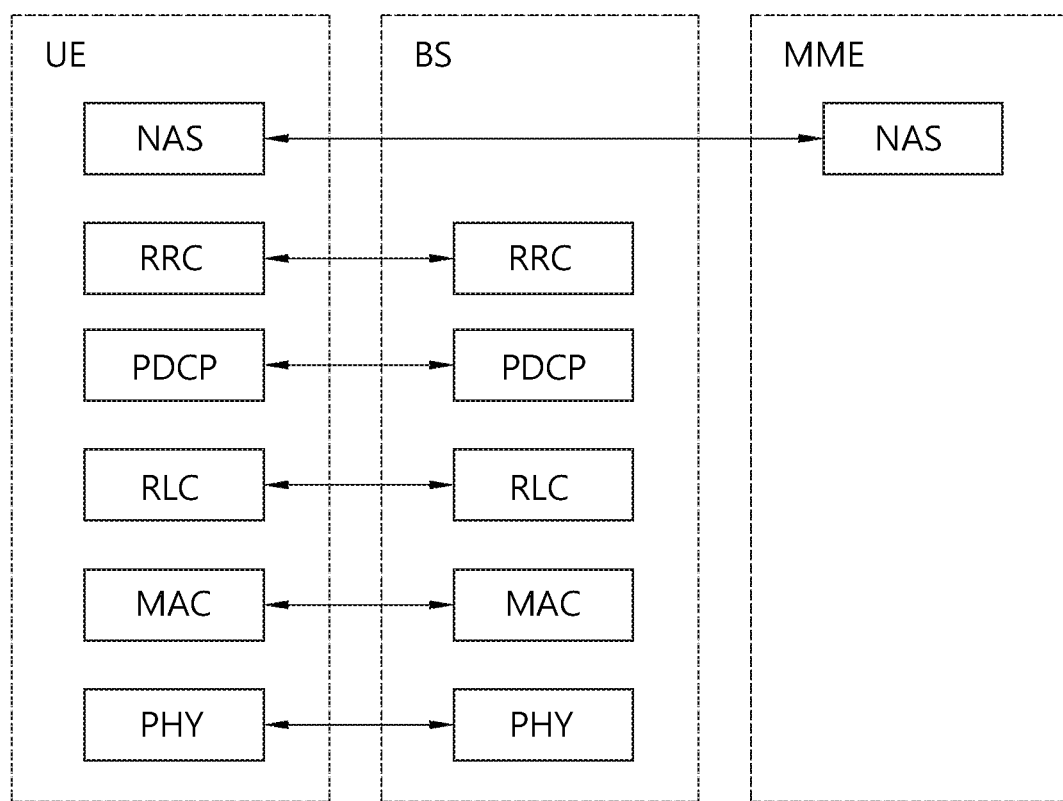
FIG. 2 shows a control plane of a radio interface protocol of an LTE system.
Figure 3:
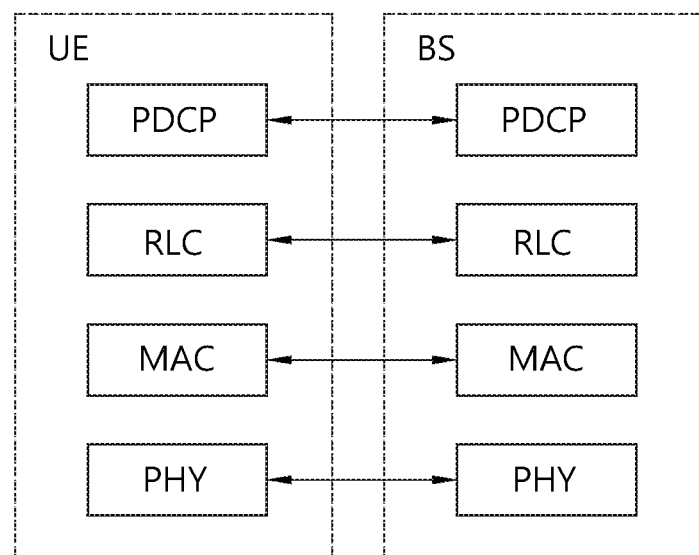
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel A physical channel is mapped to the transport channel. Data is transferred between the MAC layer and the PHY layer through the transport channel Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Figure 4:
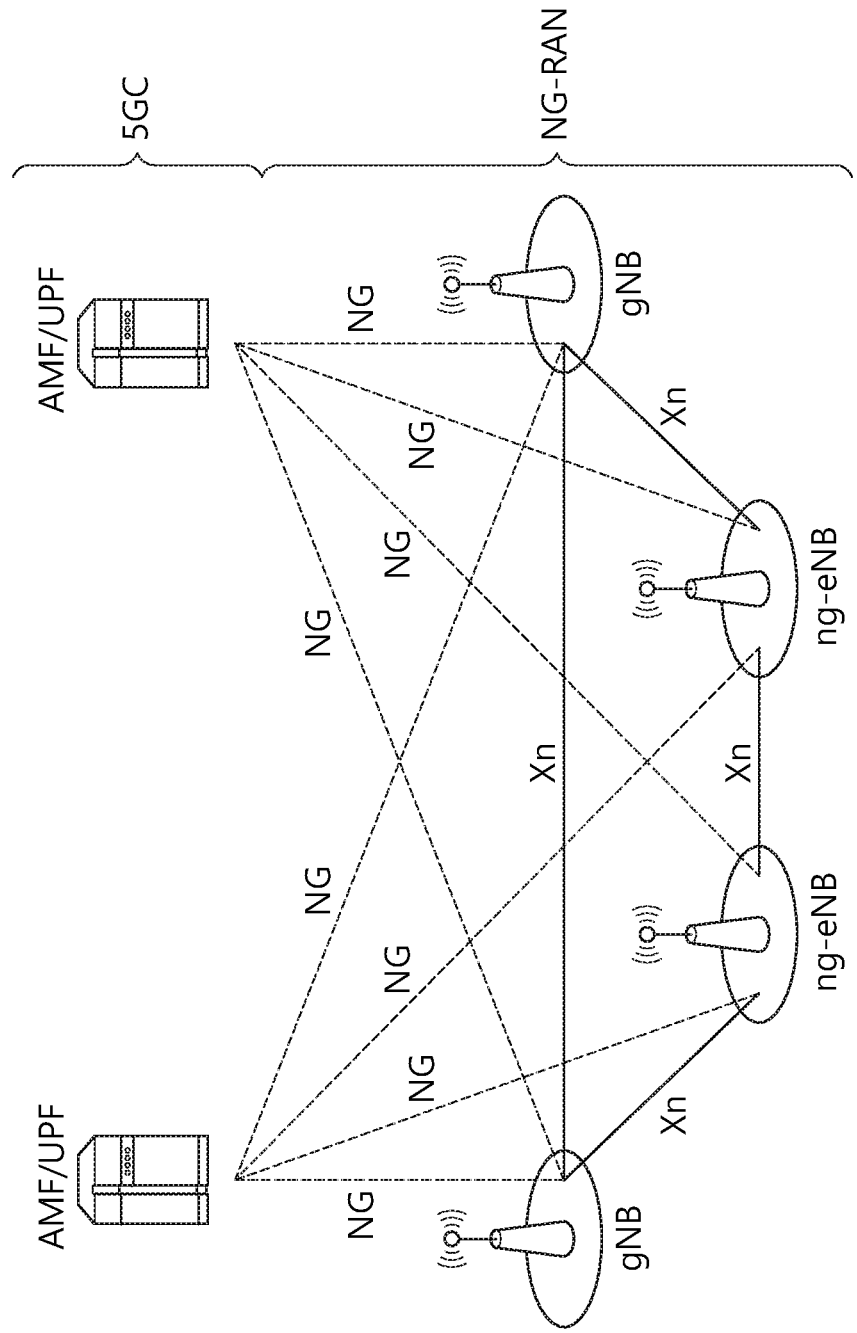
FIG. 4 shows 5G system architecture.

FIG. 4 shows 5G system architecture.

Referring to FIG. 4, a Next Generation Radio Access Network (NG-RAN) node may be either a gNB providing NR Radio Access (NR) user plane and control plane protocol terminations towards the UE or an ng-eNB providing Evolved Universal Terrestrial Radio Access (E-UTRA) user plane and control plane protocol terminations towards the UE. The gNBs and ng-eNBs may be interconnected with each other by means of the Xn interface. The gNBs and ng-eNBs may be also connected by means of the NG interfaces to the 5G Core Network (5GC), more specifically to the AMF (Access and Mobility Management Function) by means of the NG-C interface and to the UPF (User Plane Function) by means of the NG-U interface. The NG-C may be control plane interface between NG-RAN and 5GC, and the NG-U may be user plane interface between NG-RAN and 5GC.

Figure 5:
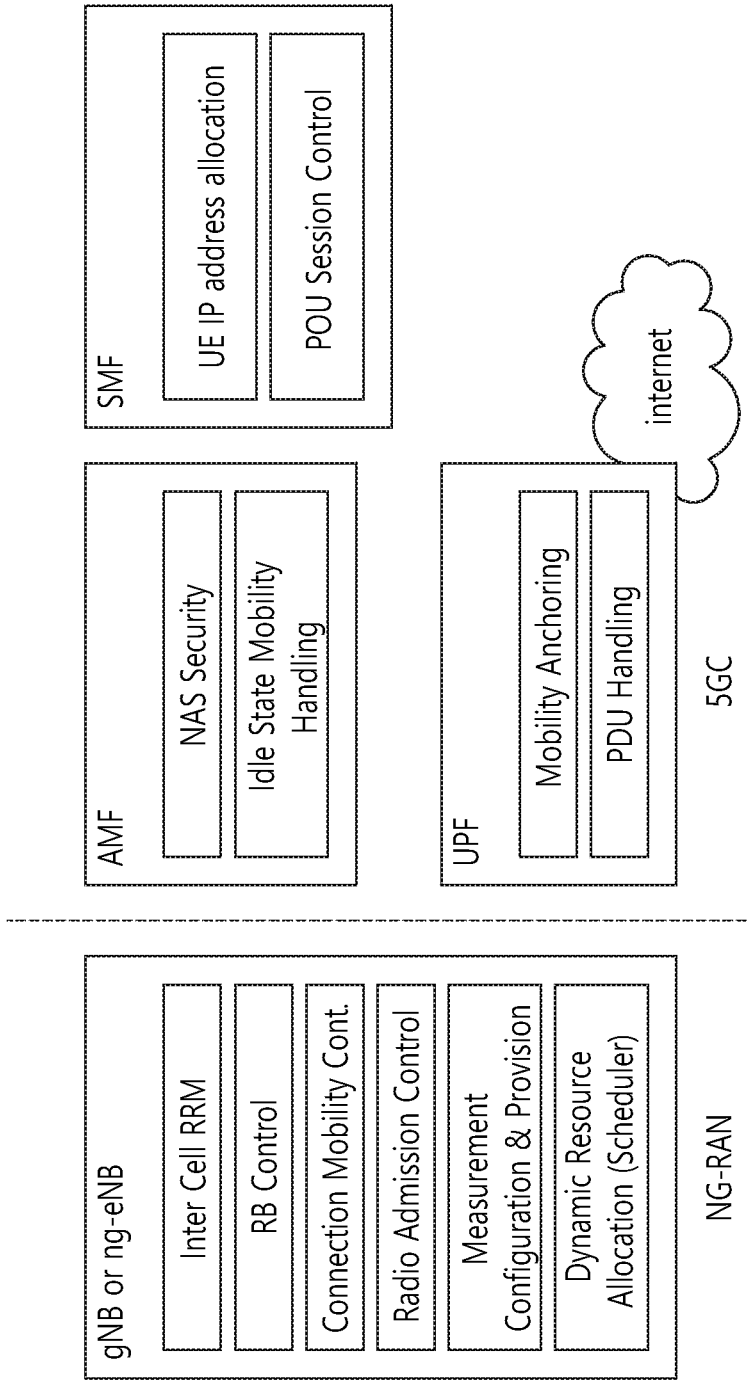
FIG. 5 shows functional split between NG-RAN and 5GC.

FIG. 5 shows functional split between NG-RAN and 5GC.

Referring to FIG. 5, the gNB and ng-eNB may host the following functions:

Functions for Radio Resource Management: Radio Bearer Control, Radio Admission Control, Connection Mobility Control, Dynamic allocation of resources to UEs in both uplink and downlink (scheduling);
IP header compression, encryption and integrity protection of data;
Selection of an AMF at UE attachment when no routing to an AMF can be determined from the information provided by the UE;
Routing of User Plane data towards UPF(s);
Routing of Control Plane information towards AMF;
Connection setup and release;
Scheduling and transmission of paging messages;
Scheduling and transmission of system broadcast information (originated from the AMF or O&M);
Measurement and measurement reporting configuration for mobility and scheduling;
Transport level packet marking in the uplink;
Session Management;
Support of Network Slicing;
QoS Flow management and mapping to data radio bearers;
Support of UEs in RRC_INACTIVE state;
Distribution function for NAS messages;
Radio access network sharing;
Dual Connectivity;
Tight interworking between NR and E-UTRA.

The Access and Mobility Management Function (AMF) may host the following main functions:

NAS signalling termination;
NAS signalling security;
AS Security control;
Inter CN node signalling for mobility between 3GPP access networks;
Idle mode UE Reachability (including control and execution of paging retransmission);
Registration Area management;
Support of intra-system and inter-system mobility;
Access Authentication;
Access Authorization including check of roaming rights;
Mobility management control (subscription and policies);
Support of Network Slicing;
SMF selection.

The User Plane Function (UPF) may host the following main functions:

Anchor point for Intra-/Inter-RAT mobility (when applicable);
External PDU session point of interconnect to Data Network;
Packet routing & forwarding;
Packet inspection and User plane part of Policy rule enforcement;
Traffic usage reporting;
Uplink classifier to support routing traffic flows to a data network;
Branching point to support multi-homed PDU session;
QoS handling for user plane, e.g. packet filtering, gating, UL/DL rate enforcement;
Uplink Traffic verification (SDF to QoS flow mapping);
Downlink packet buffering and downlink data notification triggering.

The Session Management function (SMF) may host the following main functions:

Session Management;
UE IP address allocation and management;
Selection and control of UP function;
Configures traffic steering at UPF to route traffic to proper destination;
Control part of policy enforcement and QoS;
Downlink Data Notification.

Hereinafter, a random access procedure in LTE system is described.

First of all, a user equipment performs a random access procedure in the event of one of the following cases.

Case that a user equipment performs an initial access without a connection (e.g., RRC connection) to a base station
Case that a user equipment initially accesses a target cell by a handover procedure
Case requested by a command given by a base station Case that data in uplink is generated in a situation that an uplink time synchronization is not matched or a radio resource used to request a radio resource is not allocated Case of a recovery process in case of a radio link failure (RLF) or a handover failure In LTE system, a non-contention based random access procedure is provided as follows. First of all, a base station assigns a dedicated random access preamble designated to a specific user equipment. Secondly, the corresponding user equipment performs a random access procedure using the random access preamble. So to speak, in a process for selecting a random access preamble, there are a contention based random access procedure and a non-contention based random access procedure. In particular, according to the contention based random access procedure, a user equipment randomly selects one random access preamble from a specific set and then uses the selected random access preamble. According to the non-contention based random access procedure, a random access preamble assigned by a base station to a specific user equipment only is used. Differences between the two kinds of the random access procedures lie in a presence or non-presence of occurrence of a contention problem. The non-contention based random access procedure can be used, as mentioned in the foregoing description, only if a handover process is performed or it is requested by a command given by a base station.

Figure 6:
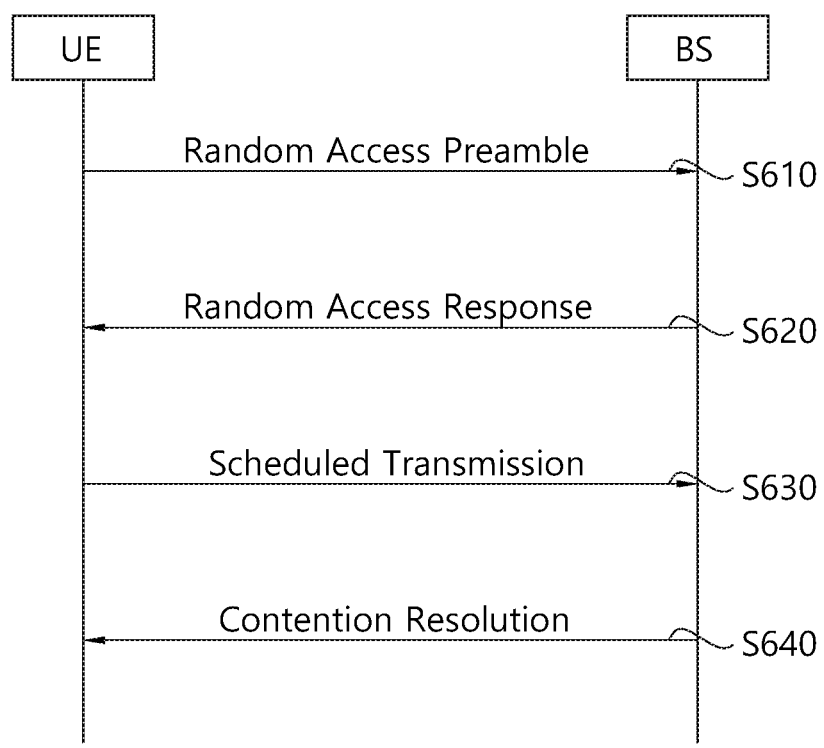
FIG. 6 shows a contention based random access procedure.

FIG. 6 shows a contention based random access procedure.

In step S610, in a contention based random access procedure, a user equipment randomly selects a random access preamble from a set of random access preambles indicated through a system information or a handover command, selects a PRACH (physical RACH) resource capable of carrying the selected random access preamble, and then transmits the corresponding random access preamble through the selected resource.

In step S620, after the user equipment has transmitted the random access preamble in the above manner, it attempts a reception of its random access response within a random access response receiving window indicated through the system information or the handover command from a base station. In particular, the random access response information is transmitted in format of MAC PDU. And, the MAC PDU is delivered through PDSCH (physical downlink shared channel). In order for the user equipment to appropriately receive the information delivered through the PDSCH, PDCCH is delivered as well. In particular, information on the user equipment supposed to receive the PDSCH, frequency and time information of a radio resource of the PDSCH, a transmission format of the PDSCH and the like are included in the PDCCH. Once the user equipment successfully receives the PDCCH transmitted to itself, the user equipment appropriately receives a random access response transmitted on the PDSCH according to the informations of the PDCCH. And, in the random access response, a random access preamble identifier (ID), a UL grant (UL radio resource), a temporary cell identifier (temporary C-RNTI) and time alignment commands (time synchronization correction values, hereinafter abbreviated TAC) are included. As mentioned in the above description, the random access preamble identifier is required for the random access response. The reason for this is described as follows. First of all, since random access response information for at least one or more user equipments may be included in a single random access response, it is necessary to notify that the UL grant, the temporary C-RNTI and the TAC are valid for which one of the user equipments. And, the random access preamble identifier matches the random access preamble selected by the user equipment in the step S610.

In step S630, if the user equipment receives the random access response valid for itself, the user equipment individually processes each of the information included in the received random access response. In particular, the user equipment applies the TAC and saves the temporary C-RNTI. Moreover, the user equipment transmits a data saved in its buffer or a newly generated data to the base station using the received UL grant. In this case, the data included in the UL grant should contain an identifier of the user equipment. In the contention based random access procedure, the base station is unable to determine what kinds of user equipments perform the random access procedure. Hence, in order to resolve the contention in the future, the base station should identify the corresponding user equipment. The identifier of the user equipment can be included by one of two kinds of methods as follows. First of all, if the user equipment has a valid cell identifier previously assigned by a corresponding cell prior to the random access procedure, the user equipment transmits its cell identifier through the UL grant. On the contrary, if the user equipment fails in receiving the valid cell identifier prior to the random access procedure, the user equipment transmits its unique identifier (e.g., S-TMSI, Random Id, etc.) inclusively. In general, the unique ID is longer than a cell identifier. If the user equipment transmits the data through the UL grant, the user equipment initiates a timer for contention resolution (hereinafter called a contention resolution timer).

In step S640, after the user equipment has transmitted the data containing its identifier through the UL grant included in the random access response, it waits for an indication from the base station for the contention resolution. In particular, the user equipment attempts a reception of the PDCCH in order to receive a specific message. In receiving the PDCCH, there are two kinds of methods. As mentioned in the foregoing description, if the user equipment's identifier transmitted through the UL grant is the cell identifier, the user equipment attempts a reception of the PDCCH using its cell identifier. If the identifier is the unique identifier, the user equipment attempts the reception of the PDCCH using the temporary C-RNTI included in the random access response. Thereafter, in the former case, if the user equipment receives the PDCCH through its cell identifier before the expiration of the contention resolution timer, the user equipment determines that the random access procedure has been normally performed and then ends the random access procedure. In the latter case, if the user equipment receives the PDCCH through the temporary cell identifier before the expiration of the contention resolution timer, the user equipment checks data delivered by the PDSCH indicated by the PDCCH. If the unique identifier of the user equipment is included in the substance of the data, the user equipment determines that the random access procedure has been normally performed and then ends the random access procedure.

Figure 7:
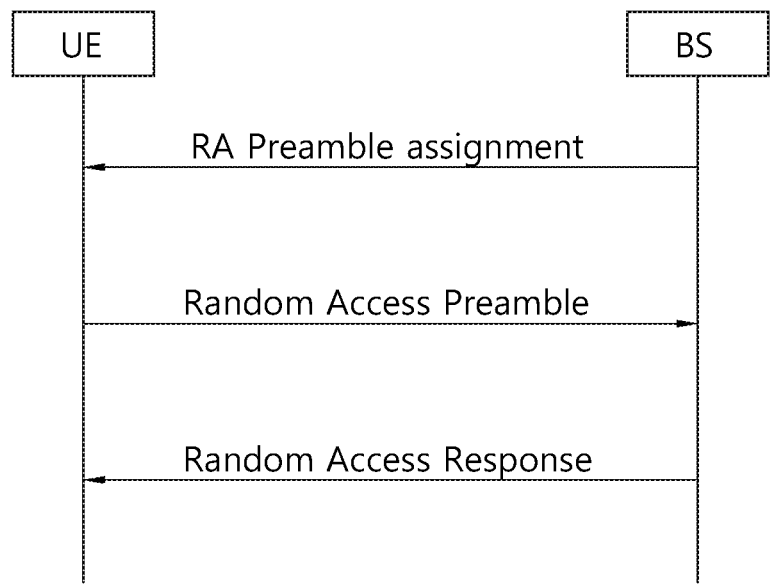
FIG. 7 shows a non-contention based random access procedure.

FIG. 7 shows a non-contention based random access procedure.

Unlike the contention based random access procedure, in a non-contention based random access procedure, if a random access response information is received, a random access procedure is ended by determining that the random access procedure has been normally performed. The non-contention based random access procedure may exist in one of the two cases, i.e., a first case of a handover process and a second case requested by a command given by a base station. Of course, a contention based random access procedure can be performed in one of the two cases. First of all, for a non-contention based random access procedure, it is important to receive a designated random access preamble having no possibility in contention from a base station. The random access preamble can be indicated by a handover command or a PDCCH command After the base station has assigned the random access preamble designated only to the user equipment, the user equipment transmits the preamble to the base station.

Hereinafter, a protocol data unit (PDU) is described.

A MAC PDU is a bit string that is byte aligned (i.e. multiple of 8 bits) in length. MAC SDUs are bit strings that are byte aligned (i.e. multiple of 8 bits) in length. A service data unit (SDU) is included into a MAC PDU from the first bit onward.

Figure 8:
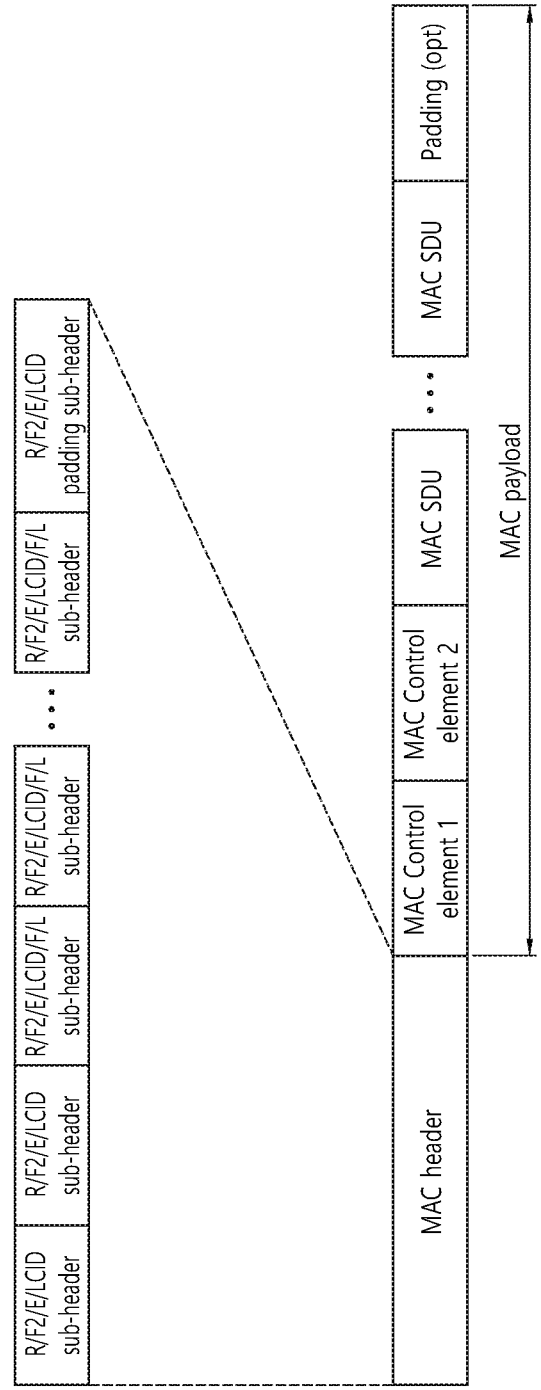
FIG. 8 shows an example of MAC PDU including MAC header, MAC control elements, MAC SDUs and padding.

FIG. 8 shows an example of MAC PDU including MAC header, MAC control elements, MAC SDUs and padding.

Referring to FIG. 8, a MAC PDU consists of a MAC header, zero or more MAC SDUs, zero or more MAC control elements, and optionally padding. Both the MAC header and the MAC SDUs are of variable sizes. Both the MAC header and the MAC SDUs are of variable sizes. A MAC PDU header consists of one or more MAC PDU subheaders. Each subheader corresponds to either a MAC SDU, a MAC control element or padding. A MAC PDU subheader consists of the five or six header fields R/F2/E/LCID/(F)/L but for the last subheader in the MAC PDU and for fixed sized MAC control elements. The last subheader in the MAC PDU and subheaders for fixed sized MAC control elements consist solely of the four header fields R/F2/E/LCID. A MAC PDU subheader corresponding to padding consists of the four header fields R/F2/E/LCID.

MAC PDU subheaders have the same order as the corresponding MAC SDUs, MAC control elements and padding. MAC control elements are always placed before any MAC SDU. Padding occurs at the end of the MAC PDU, except when single-byte or two-byte padding is required. Padding may have any value and the MAC entity shall ignore it. When padding is performed at the end of the MAC PDU, zero or more padding bytes are allowed. When single-byte or two-byte padding is required, one or two MAC PDU subheaders corresponding to padding are placed at the beginning of the MAC PDU before any other MAC PDU subheader. A maximum of one MAC PDU can be transmitted per transport block (TB) per MAC entity. A maximum of one MCH MAC PDU can be transmitted per transmission time interval (TTI).

Meanwhile, for low cost UE, it is important to save UE power. For example, the low cost UE includes Narrow Band Internet of Things (NB-IoT) UE, Bandwidth reduced Low complexity (BL) UE, Machine Type Communication (MTC) UE or a UE in enhanced coverage. Thus, the number of transmissions should be reduced as many as possible. Early data transmission (EDT) in RRC Connection Establishment or RRC Connection Resume is one of the solutions to reduce UE power consumption. However, the current system does not support early data transmission. Hereinafter, a method for a UE to perform EDT and an apparatus supporting the same according to an embodiment of the present invention are described in detail. In the specification, the EDT may be uplink data transmission during the random access procedure. The EDT may allow one uplink data transmission optionally followed by one downlink data transmission during the random access procedure. For example, the EDT may allow one uplink data transmission optionally followed by one downlink data transmission during the random access procedure without establishing or resuming the RRC connection. S1 connection may be established or resumed upon reception of the uplink data and may be released or suspended after transmission of the downlink data. Early data transmission may refer to both control plane (CP)-EDT and user plane (UP)-EDT.

According to an embodiment of the present invention, while performing state transition procedure such as RRC connection establishment procedure or RRC connection resume procedure, the UE may transmit data in a message over signaling radio bearer (SRB) such as DCCH or CCCH. The message may be a NAS message or a RRC message such as RRC Connection Request message or RRC connection resume message. Alternatively, while performing state transition procedure such as RRC connection establishment procedure or RRC connection resume procedure, the UE may transmit data in a message over data radio bearer (DRB) configured for EDT.

Figure 9:
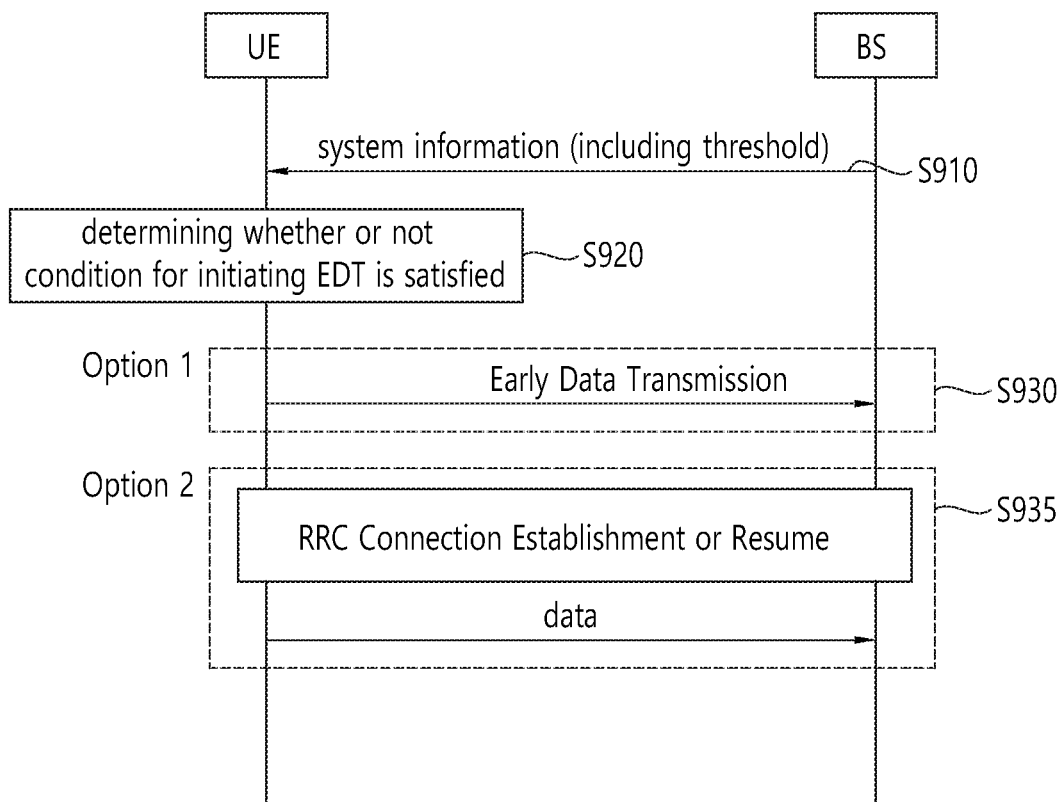
FIG. 9 shows a procedure for determining whether or not to perform EDT according to an embodiment of the present invention.

FIG. 9 shows a procedure for determining whether or not to perform EDT according to an embodiment of the present invention.

The EDT may be triggered when the upper layers have requested the establishment or resumption of the RRC Connection for Mobile Originated data (i.e., not signaling or SMS) and the uplink data size is less than or equal to a transport block (TB) size indicated in the system information. The EDT may be not used for data over the control plane when using the User Plane CIoT EPS optimizations. The EDT may be applicable to BL UEs, UEs in enhanced coverage or NB-IoT UEs. The EDT may be initiated by the upper layers (e.g. UE RRC).

Referring to FIG. 9, in step S910, the UE may receive system information including a threshold for the EDT, from a base station. The threshold for the EDT may be a threshold related to a size of data for EDT. The threshold for the EDT may be a threshold related to QoS characteristics, maximum bit rate or delay requirement to the UE. For example, the system information may be defined as table 1.

TABLE 1

EDT-TBS-NB-r15 ::=   SEQUENCE {
    edt-SmallTBS-Enabled-r15            BOOLEAN,
    edt-TBS-r15                 ENUMERATED {b328, b408,
b504, b584, b680, b808, b936, b1000}
}

Referring to table 1, the edt-SmallTBS-Enabled may be a value TRUE which indicates that UE performing EDT is allowed to select TBS smaller than edt-TBS for Msg3 according to the corresponding NPRACH resource. The edt-TBS may be largest TBS for Msg3 for a NPRACH resource applicable to a UE performing EDT. Value in bits. Value b328 corresponds to 328 bits, value b408 corresponds to 408 bits and so on. The edt-TBS may be a threshold related to a size of data for EDT In step S920, the UE may determine whether or not a condition for initiating EDT is satisfied, based on the threshold and a size of data for transmission. The data for transmission may be a layer 2 data or layer 3 data. For example, the layer 2 data may be MAC PDU. For example, the size of data may be uplink data available for transmission plus MAC header and, where required, MAC control elements.

Specifically, the UE may compare the threshold for EDT with the size of data for transmission. Then, the UE may determine whether or not the condition for initiating EDT is satisfied, by comparing the threshold for EDT with the size of data for transmission.

Option 1: If the size of data for transmission is lower than the threshold for EDT, the UE may determine that the condition for initiating EDT is satisfied. In this case, in step S930, the UE may perform the EDT. Namely, the UE may transmit data to the base station by using message 3 during the random access procedure.

Option 2: If the size of data for transmission is higher than the threshold for EDT, the UE may determine that the condition for initiating EDT is not satisfied. In this case, in step S935, the UE may not perform the EDT. Namely, the UE may transmit data to the base station after completion of RRC connection establishment or resume procedure. For example, in case that the size of data for transmission is higher than the threshold for EDT, the UE may transmit data to the base station after the UE transits from RRC_IDLE to RRC_CONNECTED. Further, a UE MAC may indicates to UE RRC that EDT is cancelled.

Furthermore, the UE may determine whether or not a condition for initiating EDT is satisfied, based on the threshold and delay requirement of the data. The threshold may be a threshold related to delay requirement for EDT. The UE may determine whether or not the data for transmission satisfies the delay requirement for EDT. If the delay requirement of the data is lower than the threshold for EDT, the UE may determine that the data for transmission satisfies the delay requirement for EDT. If the delay requirement of the data is higher than the threshold for EDT, the UE may determine that the data for transmission does not satisfy the delay requirement for EDT.

According to an embodiment of the present invention, the UE can determine whether or not to perform EDT during the random access procedure. For example, in case that the size of data for transmission is lower than the threshold for EDT, the UE may transmit data to the base station by using message 3 during the random access procedure. Thus, the power consumption of the UE (e.g. low cost UE) can be reduced.

According to an embodiment of the present invention, configuration of radio bearers may be mapped to EDT. If a cell indicates EDT for the User Plane CIoT EPS optimization, the UE supporting EDT for User Plane CIoT EPS optimization may configure DRB(s) (including RLC/PDCP entities and logical channels) mapped to EDT. The UE in RRC_CONNECTED may be configured with the DRB(s) mapped to EDT and other DRB(s) not mapped to EDT. If the UE receives RRC connection release indicating suspend indication and the DRB(s) mapped to EDT, and if the cell indicates EDT for the User Plane CIoT EPS optimization, the UE establishing a RRC connection at the cell may be allowed to transmit data available for transmission over the DRB(s) mapped to EDT while in the RRC connection establishment or resume procedure. However, the UE may be not allowed to transmit data available for transmission over the DRB(s) not mapped to EDT in the RRC connection establishment or resume procedure. If the UE transmits a MAC PDU including data over the DRB(s) mapped to EDT, a LCID indicating the DCCH mapped to EDT may be included as a MAC sub-header of the MAC PDU. The embodiment of the present invention may be applied together with the example in FIGS. 10A and 10B.

According to an embodiment of the present invention, EDT may be allowed per priority. For controlling EDT, the base station may indicate one or more priorities to the UE via system information or a dedicated RRC message such as RRC connection release message. The priority may be one of a logical channel priority and a Per Packet Priority. The priority may be mapped to one or more radio bearers or logical channels mapped to EDTs. The base station may inform the UE which priorities are allowed to perform EDT during the RRC connection establishment or resume procedure. Thus, if data becomes available for a radio bearer or a logical channel, and if the base station indicates that the priority of the radio bearer or the logical channel is allowed for EDT, the UE may perform EDT. Otherwise, the UE may not perform EDT. That is, the UE may perform data transmission after completion of RRC connection establishment or resume procedure. The embodiment of the present invention may be applied together with the example in FIGS. 10A and 10B.

According to an embodiment of the present invention, for controlling EDT, the base station may indicate one or more QoS class identifiers (QCIs) to the UE via system information or a dedicated RRC message such as RRC connection release message. The QCI may be mapped to one or more radio bearers or logical channels mapped to EDTs. The base station may inform the UE which QCI(s) are allowed to perform EDT during RRC connection establishment or resume procedure. Thus, if data becomes available for a radio bearer or a logical channel, and if the base station indicates that the QCI of the radio bearer or the logical channel is allowed for EDT, the UE may perform EDT. Otherwise, the UE may not perform EDT. That is, the UE may perform data transmission after completion of RRC connection establishment or resume procedure. The embodiment of the present invention may be applied together with the example in FIGS. 10A and 10B.

According to an embodiment of the present invention, for controlling EDT, the base station may indicate one or more QoS flows to the UE via system information or a dedicated RRC message such as RRC connection release message. The QoS flow may be mapped to one or more radio bearers or logical channels mapped to EDTs. The base station may inform the UE which QoS flow(s) are allowed to perform EDT during RRC connection establishment or resume procedure. Thus, if data becomes available for a radio bearer or a logical channel, and if the base station indicates that the QoS flow of the radio bearer or the logical channel is allowed for EDT, the UE may perform EDT. Otherwise, the UE may not perform EDT. That is, the UE may perform data transmission after completion of RRC connection establishment or resume procedure. The embodiment of the present invention may be applied together with the example in FIGS. 10A and 10B.

According to an embodiment of the present invention, EDT may be allowed based on QoS characteristics such as bit rate or delay. For controlling EDT, the base station may indicate one or more thresholds. The one or more thresholds may be related to at least one of QoS characteristics, the amount of data (e.g. a size of data), (maximum) bit rate or delay requirement to the UE via system information or a dedicated RRC message such as RRC connection release message. The QoS characteristics, (maximum) bit rate or delay requirement may be mapped to one or more radio bearers or logical channels mapped to EDTs.

For example, the base station may inform the UE about maximum bit rate which is allowed to perform EDT during RRC connection establishment or resume procedure. Thus, if data becomes available for a radio bearer or a logical channel, and if the amount of data (e.g. a size of data or size of message) available for transmission is lower than the threshold indicated by the base station, UE performs EDT. The threshold may be included in the system information, and the data may be in layer 2 (e.g. MAC PDU) and/or layer 3 (e.g. RRC message). Otherwise, the UE may not perform EDT. That is, the UE may perform data transmission after completion of RRC connection establishment or resume procedure.

For example, the base station may inform the UE about delay requirement which is allowed to perform EDT during RRC connection establishment or resume procedure. Thus, if data becomes available for a radio bearer or a logical channel, and if the amount of data (e.g. a size of data or size of message) available for transmission should meet the delay requirement indicated by the base station, e.g. the data should be transmitted within 100 ms indicated by the base station, the UE may perform EDT. Otherwise, the UE may not perform EDT. That is, the UE may perform data transmission after completion of RRC connection establishment or resume procedure. The embodiment of the present invention may be applied together with the example in FIGS. 10A and 10B.

Figure 10A:
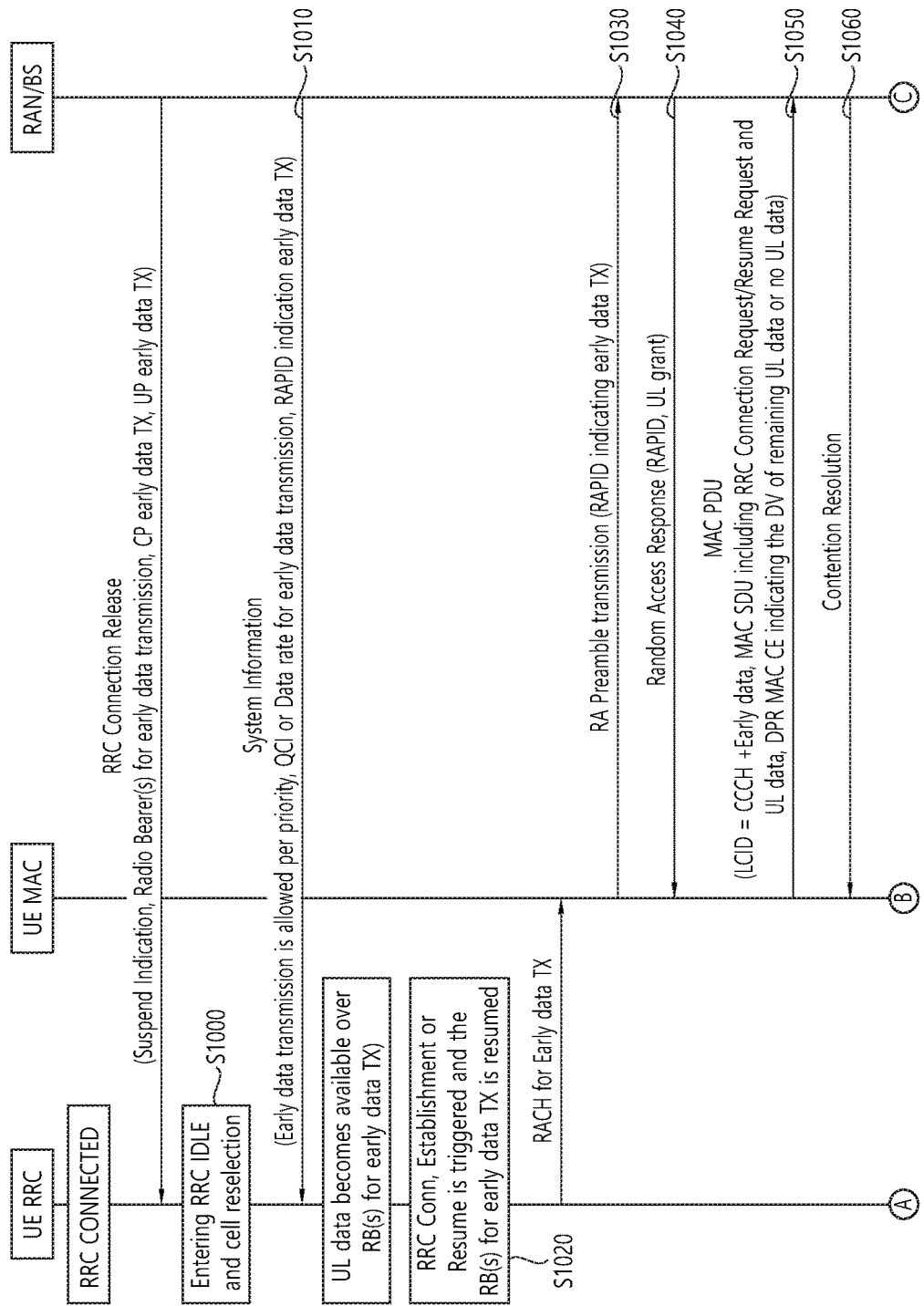
FIGS. 10A and 10B show a procedure for performing EDT according to an embodiment of the present invention.
Figure 10B:
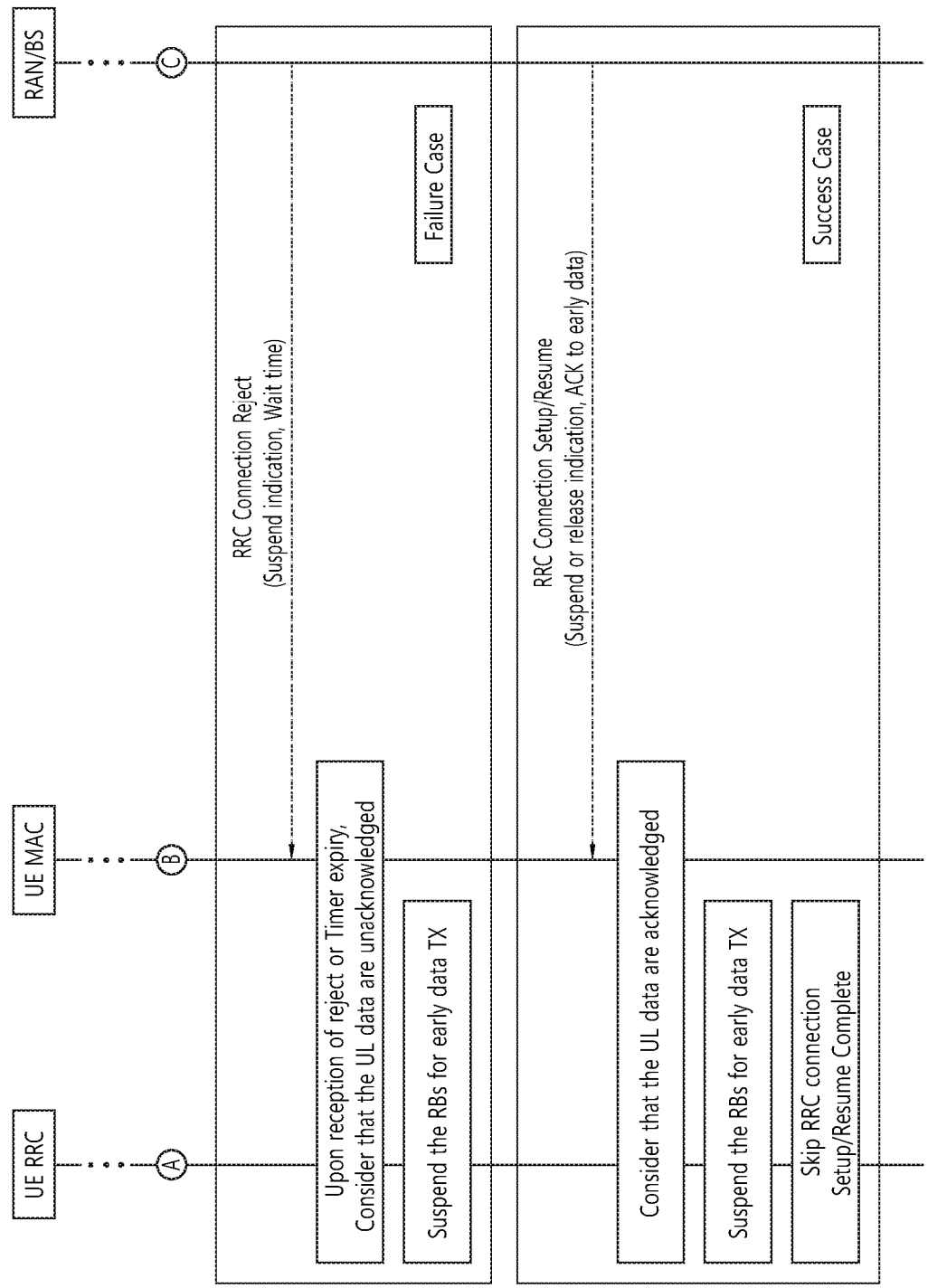

FIGS. 10A and 10B show a procedure for performing EDT according to an embodiment of the present invention.

Referring to FIGS. 10A and 10B, in step S1000, the UE may camp on a cell. For example, the cell may be a NB-IoT cell or a LTE cell supporting one or more narrowband for low cost UE capabilities such Category M1.

In step S1010, the UE may receive system information from a base station via the cell. The system information may broadcast at least one of configuration of CCCH2 for EDT, configuration of radio bearers (e.g. DRBs including DTCHs) mapped to EDT, RAPID indicating EDT or LCID of CCCH2 for EDT. Each cell may inform one or more UEs that this cell supports EDT for the Control Plane CIoT EPS optimization and/or EDT for the User Plane CIoT EPS optimization via system information.

If the cell indicates EDT for the User Plane CIoT EPS optimization, the UE supporting EDT for User Plane CIoT EPS optimization may configure DRB(s) (including RLC/PDCP entities and logical channels) mapped to EDT. In this case, the UE may configure one CCCH logical channel and one or more DTCH logical channels for uplink. The CCCH logical channel may have a higher priority than the DTCH logical channel(s) mapped to EDT and all MAC Control Elements. The DTCH logical channel(s) mapped to EDT may have a higher priority than some or all of MAC Control Element(s) (e.g. The Data Volume and Power Headroom Report (DPR) MAC control element, Buffer Status Report MAC Control Element, Power Headroom MAC Control Element). The DTCH logical channel(s) mapped to EDT may have a higher priority than the DTCH logical channels not mapped to EDT.

If the cell indicates EDT for the Control Plane CIoT EPS optimization, the UE supporting EDT for Control Plane CIoT EPS optimization may configure CCCH2 for EDT. In this case, the UE may configure two different CCCH logical channels for uplink. The first CCCH logical channel may have a higher priority than the second CCCH logical channel in MAC logical channel prioritization. The first CCCH logical channel may be SRB0 while the second CCCH logical channel may be SRB0bis. The first CCCH logical channel may be applicable for uplink and downlink, while the second CCCH logical channel may be applicable only for uplink. The first CCCH logical channel may have a higher priority than all MAC Control Elements. The second CCCH logical channel may have a lower priority than a certain MAC Control Element(s) (e.g. The Data Volume and Power Headroom Report (DPR) MAC control element, Buffer Status Report MAC Control Element, Power Headroom MAC Control Element). The second CCCH logical channel may have a higher priority than the other MAC Control Element(s). Alternatively, both CCCH logical channels may have a higher priority than all MAC Control Elements.

The CCCH2 may be replaced by DCCH mapped to EDT or a legacy CCCH. For example, DCCH mapped to EDT may be used to carry EDT instead of CCCH2. However, DCCH not mapped to EDT may not be used to carry EDT.

If the cell does not indicate EDT, UE does not perform EDT.

In step S1020, if the UE has been suspended after release of the previous RRC connection, DTCH(s) mapped to EDT may have been configured but suspended for the UE. In this case, if UE detects UL data for the DTCH(s), the UE may resume the DTCH(s) mapped to EDT and then submit the UL data to lower layers (RLC/PDCP entities) over the DTCH mapped to EDT. This behavior may not be applied to DTCHs (i.e. DRBs) not mapped to EDT. Thus, the UE may not perform EDT for UL data over DTCHs (i.e. DRBs) not mapped to EDT. If the UE detects UL data, the UE may also trigger RRC connection establishment procedure or RRC connection resume procedure. The RRC connection request message or the RRC connection resume request message may be submitted to CCCH1 for SRB0.

In step S1030, if a random access procedure is triggered, the MAC layer of the UE (i.e. UE MAC) may select one of random access preamble identifiers (RAPIDs) mapped to EDT (as received from the cell via system information). Then, the UE may transmit a random access preamble with the selected random access preamble identifier (RAPID).

In step S1040, the UE MAC may receive a random access response (RAR) message indicating the transmitted RAPID and an uplink grant. If the UE MAC receives no RAR indicating the transmitted RAPID, the UE MAC re-transmits a random access preamble with power ramping.

The UE MAC may perform logical channel prioritization. Then, the UE MAC may construct MAC PDU based on logical channel priorities and the uplink grant. In the logical channel prioritization, CCCH1 and the DCCHs mapped to EDT may have a higher priority than all MAC Control Elements and the other DCCHs not mapped to EDT.

In the MAC PDU, if data from CCCH is included, LCID indicating CCCH may be included as a MAC sub-header. In addition, if data from the DCCH mapped to EDT is included, LCID indicating the DCCH mapped to EDT may be included as a MAC sub-header.

If the received UL grant can accommodate all UL data in the DCCH mapped to EDT, and if the UE has no remaining UL data over any logical channel, the UE may include buffer status reporting (BSR) MAC Control Element indicating no data, Data Volume and Power Headroom Report (DPR) MAC Control Element indicating no data (i.e. DV value=0), or no MAC Control Element.

If the received UL grant can accommodate some UL data in the DCCH mapped to EDT with a MAC Control Element such as BSR MAC CE or DPR MAC CE, and if the UE has remaining UL data over any logical channel, the UE may include BSR MAC CE indicating the amount of the remaining UL data or DPR MAC CE indicating the amount of the remaining UL data.

If the received UL grant cannot accommodate any UL data in the DCCH mapped to EDT with a MAC Control Element such as BSR MAC CE or DPR MAC CE, the UE may include BSR MAC CE indicating the amount of the remaining UL data or DPR MAC CE indicating the amount of the remaining UL data.

In step S1050, the UE MAC may transmit the MAC PDU (i.e. Message 3 (MSG3)) to the base station by using the uplink grant.

In step S1060, if the UE MAC may receive contention resolution to the message 3 from the base station (e.g. via PDCCH or Contention Resolution MAC CE), the UE MAC may consider the RACH procedure successful. Otherwise, the UE MAC may re-transmit a random access preamble.

The UE may receive RRC connection setup message or RRC connection resume message from the base station. If the received message indicates NACK to EDT, the layer of the UE received the NACK may send the NACK to a higher layer of the UE. For example, for EDT over SRB in Control Plane CIoT EPS optimization, if the UE RRC receives the NACK from the message, the UE RRC may inform UE NAS about the NACK to the UL data. Upon receiving the NACK, the higher layer of the UE (e.g. UE NAS) may re-transmit the UL data. If so, the UE RRC may create a RRC message including the UL data and submit the RRC message to lower layers (e.g. PDCP/RLC/MAC). The RRC message may be carried over either CCCH2 or DCCH. If the message is carried over DCCH, the message may be a RRC connection setup/resume complete including UL data. The UL data may include UL data which is NACKed and/or remaining UL data. Thus, the UE may transmit a single MAC SDU including RRC connection setup/resume complete including UL data with a MAC CE in a single MAC PDU. The MAC CE in the MAC PDU may be either BSR MAC CE indicating the amount of the remaining UL data or DPR MAC CE indicating the amount of the remaining UL data. If there is no remaining UL data except the UL data included in the MAC PDU, the MAC CE may indicate no data.

If the UE receives a RRC message indicating that the data are acknowledged, the UE may consider that the data are acknowledged in Layer 1, 2 or 3, and the UE may stop (re-)transmissions of any data and RLC/MAC acknowledgements, if any. The UE may release the RRC connection and Layer 2 entities, and enter RRC_IDLE. The RRC message may be one of RRC connection release, a RRC connection reject message, a RRC connection setup message and a RRC connection resume message.

For example, if the MAC CE indicates no data, and if the base station successfully receives all UL data, in case there is no DL data, the base station may transmit RRC connection release indicating ACK to the UL data. Upon receiving the RRC connection release indicating ACK to the UL data, the UE may consider that the UL data that were transmitted are acknowledged and enter RRC_IDLE. The UE RRC may inform UE RLC/MAC that the UL data that were transmitted are acknowledged and (re-)transmissions should be stopped.

If the UE receives RRC connection release or reject message not indicating ACK to the UL data, the UE may consider that the UL data that were transmitted are unacknowledged and enter RRC_IDLE. The UE may trigger RRC connection establishment procedure or RRC connection resume procedure to re-transmit unacknowledged data later.

If the UE transmits data over SRB or DRB, and if the UE receives a RRC connection setup message (or a RRC connection resume message) indicating that the data are acknowledged, the UE may not transmit a RRC connection setup complete message (or a RRC connection resume complete message), and consider the RRC procedure successful, and then enter RRC_IDLE.

If the UE transmits data over SRB or DRB, and if the RRC connection establishment or the RRC connection resume procedure with EDT fails, e.g. the procedure unsuccessfully ends due to reception of the RRC connection reject or T300 expiry, the UE may consider that the data are unacknowledged in Layer 1, 2 or 3, and the UE may stop (re-)transmissions of any data and RLC/MAC acknowledgements, if any. Then, if the data has been transmitted over DRB (or SRB), the UE may re-establish and suspend Layer 2 entities. If the data has been transmitted over SRB, the UE may release Layer 2 entities. Finally, the UE may enter RRC_IDLE and may trigger the RRC connection establishment or the RRC connection resume procedure for re-transmission of the data that was not delivered and unacknowledged in Layer 1, 2 or 3.

According to an embodiment of the present invention, the UE may perform initial transmission over one type of SRB and re-transmission over another type of SRB, based on a RRC (or NAS) message indicating NACK to the initial transmission over SRB. If the UE receives RRC connection setup message or RRC connection resume message indicating NACK to the data transmission over SRB, the UE may re-transmit the data in the same type of message (e.g. RRC connection request message or RRC connection resume message) or another type of message (e.g. RRC connection setup complete message or RRC connection resume complete message). If the UE receives a CCCH message indicating NACK to the data transmission over SRB, the UE may re-transmit the data over CCCH regardless of setup of DCCH. If the UE receives a CCCH message indicating NACK to the data transmission over SRB, the UE may re-transmit the data over DCCH, if DCCH is set up. The embodiment of the present invention may be applied together with the example in FIGS. 11A and 11B.

Figure 11A:
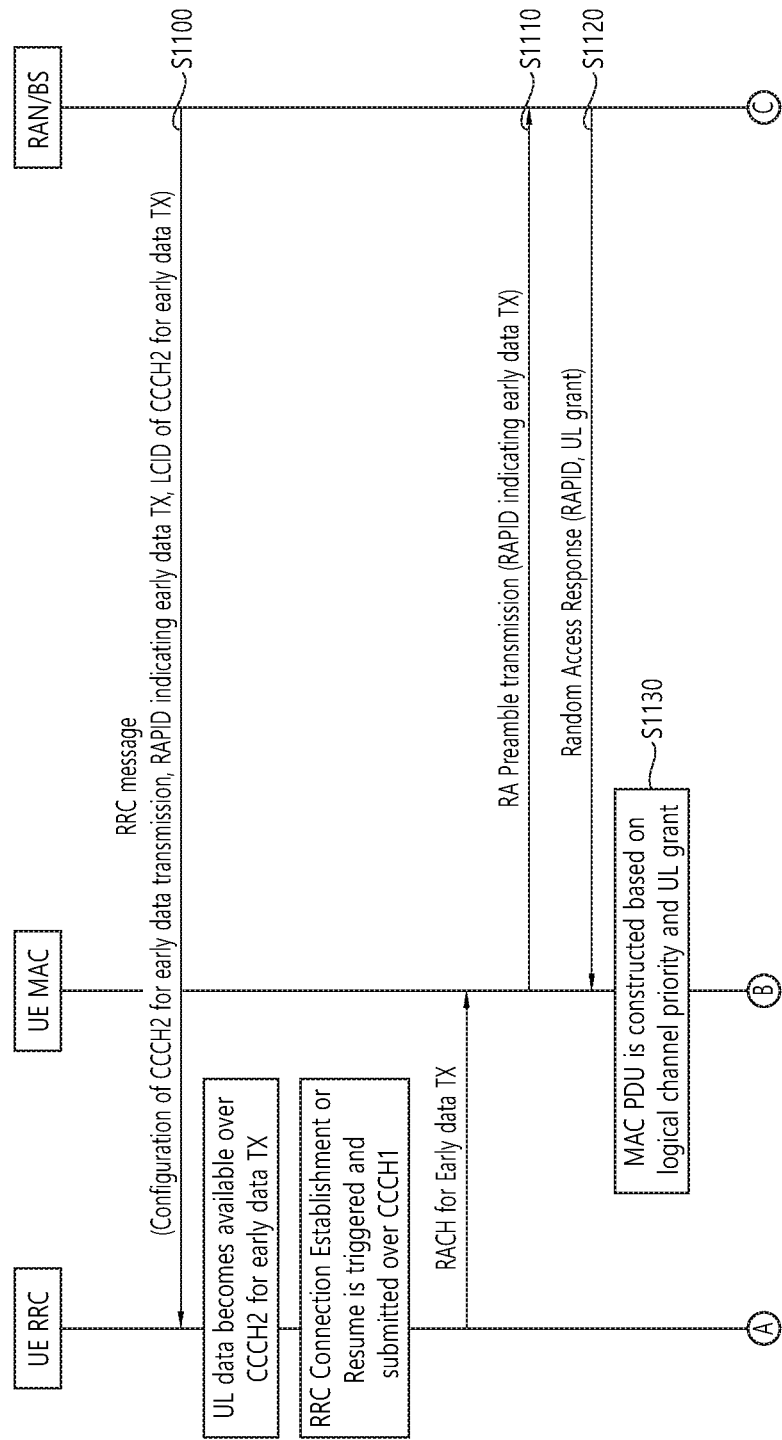
FIGS. 11A and 11B show a procedure for performing EDT according to an embodiment of the present invention.
Figure 11B:
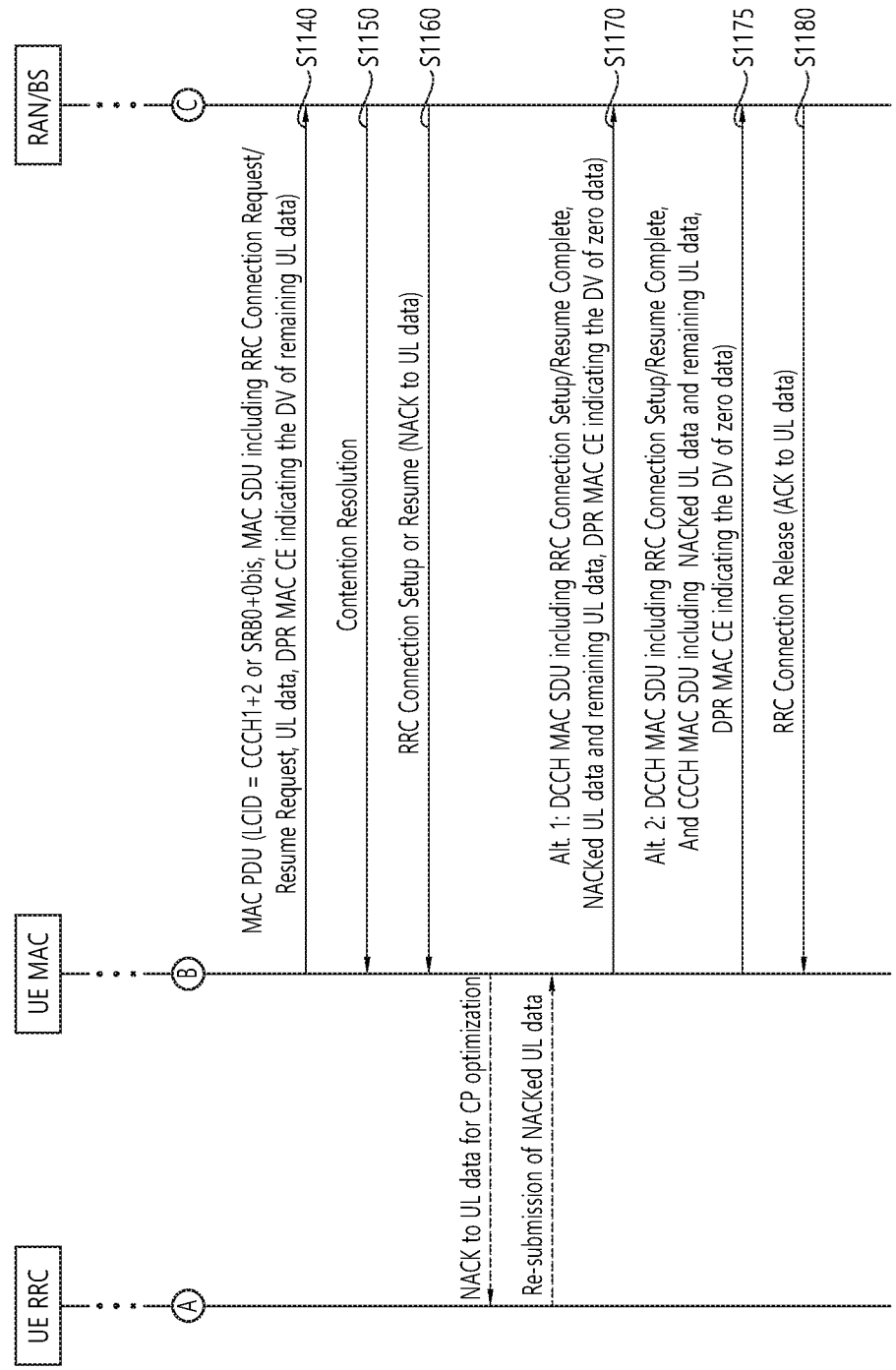

FIGS. 11A and 11B show a procedure for performing EDT according to an embodiment of the present invention.

Referring to FIGS. 11A and 11B, in step S1100, the UE may camp on a cell. For example, the cell may be a NB-IoT cell or a LTE cell supporting one or more narrowband for low cost UE capabilities such Category M1. System information may broadcast at least one of configuration of CCCH2 for EDT, configuration of radio bearers (e.g. DRBs including DTCHs) mapped to EDT, RAPID indicating EDT or LCID of CCCH2 for EDT. Each cell may inform one or more UEs that this cell supports EDT for the Control Plane CIoT EPS optimization and/or EDT for the User Plane CIoT EPS optimization via system information.

If the cell indicates EDT for the Control Plane CIoT EPS optimization, the UE supporting EDT for Control Plane CIoT EPS optimization may configure CCCH2 for EDT. In this case, the UE may configure two different CCCH logical channels for uplink. The first CCCH logical channel may have a higher priority than the second CCCH logical channel in MAC logical channel prioritization. The first CCCH logical channel may be SRB0 while the second CCCH logical channel may be SRB0bis. The first CCCH logical channel may be applicable for uplink and downlink, while the second CCCH logical channel may be applicable only for uplink. The first CCCH logical channel may have a higher priority than all MAC CEs. The second CCCH logical channel may have a lower priority than a certain MAC CE(s) (e.g. The Data Volume and Power Headroom Report (DPR) MAC CE, Buffer Status Report MAC CE, Power Headroom MAC CE), and a higher priority than the other MAC CE(s). Alternatively, both CCCH logical channels may have a higher priority than all MAC CEs. The CCCH2 may be replaced by DCCH mapped to EDT or a legacy CCCH. For example, DCCH mapped to EDT may be used to carry EDT instead of CCCH2. However, DCCH not mapped to EDT may not be used to carry EDT.

If the cell does not indicate EDT, UE does not perform EDT.

If the UE detects UL data and CCCH2 is configured, the UE may submit the UL data to lower layers over CCCH type 2 (e.g. an RLC entity of CCCH2 for SRB0bis). If the UE detects UL data and a DTCH mapped to EDT is configured, the UE may submit the UL data to lower layers (RLC/PDCP entities) over the DTCH mapped to EDT.

If the UE detects UL data, the UE may also trigger RRC connection establishment procedure or RRC connection resume procedure. The RRC connection request message or the RRC connection resume request message may be submitted to CCCH1 for SRB0.

In step S1110, if a random access procedure is triggered, the MAC layer of the UE (i.e. UE MAC) may select one of random access preamble identifiers (RAPIDs) mapped to EDT (as received from the cell via system information). Then, the UE may transmit a random access preamble with the selected random access preamble identifier (RAPID).

In step S1120, the UE MAC may receive a random access response (RAR) message indicating the transmitted RAPID and an uplink grant. If the UE MAC receives no RAR indicating the transmitted RAPID, the UE MAC re-transmits a random access preamble with power ramping.

In step S1130, the UE MAC may perform logical channel prioritization. Then, the UE MAC may construct MAC PDU based on logical channel priorities and the uplink grant. In the logical channel prioritization, CCCH1 and CCCH2 may have a higher priority than all MAC CEs.

In the MAC PDU, if data from CCCH is included, LCID indicating CCCH may be included as a MAC sub-header. In addition, if data from CCCH2 is included, LCID indicating CCCH2 may be included as a MAC sub-header.

If the received UL grant can accommodate all UL data in CCCH2, and if the UE has no remaining UL data over any logical channel, the UE may include BSR MAC CE indicating no data, DPR MAC CE indicating no data (i.e. DV value=0), or no MAC CE.

If the received UL grant can accommodate some UL data in CCCH2 with a MAC CE such as BSR MAC CE or DPR MAC CE, and if UE has remaining UL data over any logical channel, the UE may include BSR MAC CE indicating the amount of the remaining UL data or DPR MAC CE indicating the amount of the remaining UL data.

If the received UL grant cannot accommodate any UL data in CCCH2 with a MAC CE such as BSR MAC CE or DPR MAC CE, the UE may include BSR MAC CE indicating the amount of the remaining UL data or DPR MAC CE indicating the amount of the remaining UL data.

In step S1140, the UE MAC may transmit the MAC PDU (i.e. Message 3 (MSG3)) to the base station by using the uplink grant.

In step S1150, if the UE MAC may receive contention resolution to the message 3 from the base station (e.g. via PDCCH or Contention Resolution MAC CE), the UE MAC may consider the RACH procedure successful. Otherwise, the UE MAC may re-transmit a random access preamble.

In step S1160, the UE may receive RRC connection setup message or RRC connection resume message from the base station. If the received message indicates NACK to EDT, the layer of the UE received the NACK may send the NACK to a higher layer of the UE. For example, for EDT over SRB in Control Plane CIoT EPS optimization, if the UE RRC receives the NACK from the message, the UE RRC may inform UE NAS about the NACK to the UL data. Upon receiving the NACK, the higher layer of the UE (e.g. UE NAS) may re-transmit the UL data. If so, the UE RRC may create a RRC message including the UL data and submit the RRC message to lower layers (i.e. PDCP/RLC/MAC). The RRC message may be carried over either CCCH2 or DCCH.

In step S1170, if the message is carried over DCCH, the message can be a RRC connection setup/resume complete including UL data. The UL data can include UL data which is NACKed and/or remaining UL data. Thus, UE may transmit a single MAC SDU including RRC connection setup/resume complete including UL data with a MAC CE in a single MAC PDU.

In step S1175, if the message is carried over CCCH such as CCCH2, the UE may transmit a RRC connection setup/resume complete message over DCCH and the message including UL data over CCCH with a MAC CE in a single MAC PDU or separate MAC PDUs. The UL data can include UL data which is NACKed and/or remaining UL data.

The MAC CE in the MAC PDU can be either BSR MAC CE indicating the amount of the remaining UL data or DPR MAC CE indicating the amount of the remaining UL data. If there is no remaining UL data except the UL data included in the MAC PDU, the MAC CE may indicate no data.

In step S1180, if the MAC CE indicates no data, and if the base station successfully receives all UL data, in case there is no DL data, the base station may transmit RRC Connection release indicating ACK to the UL data. Upon receiving the RRC connection release indicating ACK to the UL data, the UE may consider that the UL data that were transmitted are acknowledged and enter RRC_IDLE. The UE RRC may inform UE RLC/MAC that the UL data that were transmitted are acknowledged and (re-)transmissions should be stopped.

If the UE receives RRC connection release not indicating ACK to the UL data, the UE may consider that the UL data that were transmitted are unacknowledged and enter RRC_IDLE. The UE may trigger RRC connection establishment procedure or RRC connection resume procedure to re-transmit unacknowledged data later.

Figure 12:
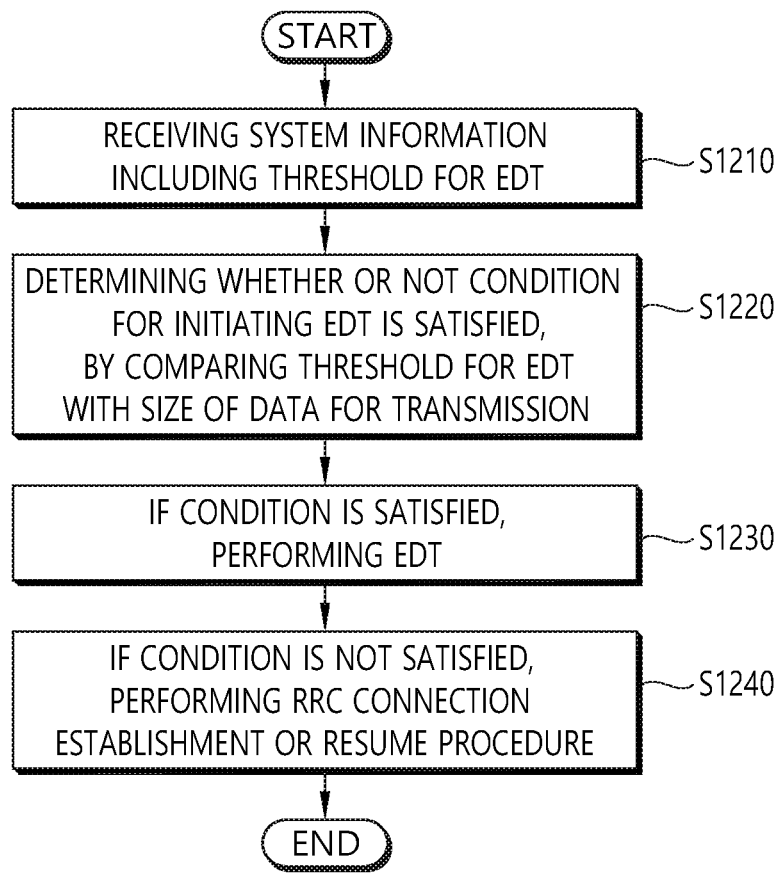
FIG. 12 is a block diagram illustrating a method for a UE to perform EDT according to an embodiment of the present invention.

FIG. 12 is a block diagram illustrating a method for a UE to perform EDT according to an embodiment of the present invention.

Referring to FIG. 12, in step S1210, the UE may receive system information including a threshold for the EDT. The UE may be in a RRC_IDLE. The UE may be an NB-IoT UE. The threshold for the EDT may be a threshold related to the size of data for the EDT.

In step S1220, the UE may determine whether or not a condition (e.g. first condition) for initiating the EDT is satisfied, by comparing the threshold for the EDT with a size of data for transmission. The EDT may be an uplink data transmission during a random access procedure.

The UE may determine that the condition for initiating the EDT is satisfied, if the size of data for transmission is lower than the threshold for the EDT. The UE may determine that the condition for initiating the EDT is not satisfied, if the size of data for transmission is higher than the threshold for the EDT. The size of data may be a data size in a layer 2 including MAC layer. The size of data for transmission may be uplink data available for transmission plus MAC header.

The threshold for the EDT may be a threshold related to delay requirement for the EDT. In this case, the UE may further determine whether or not a condition (e.g. second condition) for initiating the EDT is satisfied, by comparing the threshold for the EDT with the delay requirement of the data. The UE may determine that the condition for initiating the EDT is satisfied, if the delay requirement of the data is lower than the threshold for the EDT. The UE may determine that the condition for initiating the EDT is not satisfied, if the delay requirement of the data is higher than the threshold for the EDT.

In step S1230, the UE may perform the EDT if the condition is satisfied.

In step S1240, the UE may perform a RRC connection establishment or resume procedure if the condition is not satisfied. Furthermore, the UE may perform data transmission after the RRC connection establishment or resume procedure is performed, if the condition is not satisfied.

According to an embodiment of the present invention, the UE can determine whether or not to perform EDT during the random access procedure. For example, in case that the size of data for transmission is lower than the threshold for EDT, the UE may transmit data to the base station by using message 3 during the random access procedure. For example, in case that the size of data for transmission is lower than the threshold for EDT and the delay requirement of the data is lower than the threshold for the EDT, the UE may transmit data to the base station by using message 3 during the random access procedure. Thus, the power consumption of the UE (e.g. low cost UE) can be reduced.

Figure 13:
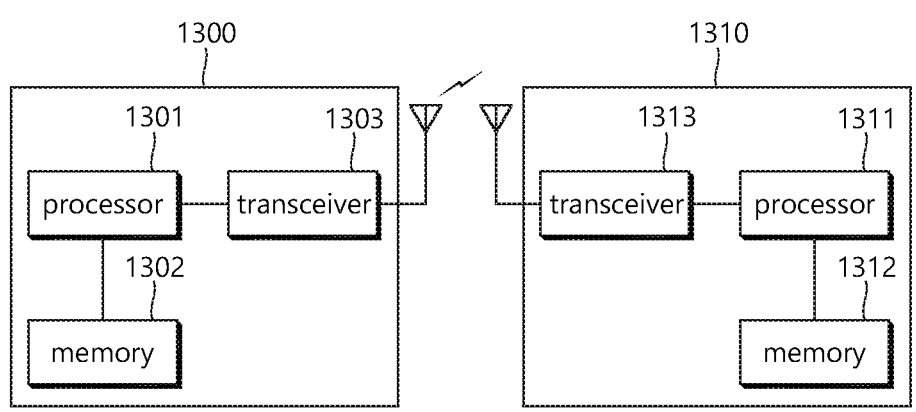
FIG. 13 is a block diagram illustrating a wireless communication system according to the embodiment of the present invention.

FIG. 13 is a block diagram illustrating a wireless communication system according to the embodiment of the present invention.

A BS 1300 includes a processor 1301, a memory 1302 and a transceiver 1303. The memory 1302 is connected to the processor 1301, and stores various information for driving the processor 1301. The transceiver 1303 is connected to the processor 1301, and transmits and/or receives radio signals. The processor 1301 implements proposed functions, processes and/or methods. In the above embodiment, an operation of the base station may be implemented by the processor 1301.

A UE 1310 includes a processor 1311, a memory 1312 and a transceiver 1313. The memory 1312 is connected to the processor 1311, and stores various information for driving the processor 1311. The transceiver 1313 is connected to the processor 1311, and transmits and/or receives radio signals. The processor 1311 implements proposed functions, processes and/or methods. In the above embodiment, an operation of the user equipment may be implemented by the processor 1311.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for transmitting, by a user equipment (UE), in a radio resource control (RRC) idle state, uplink data during a random access procedure in a wireless communication, the method comprising:
   receiving system information including (i) a threshold for early data transmission (EDT) and (ii) information representing that the EDT is allowed, from a base station (BS);
   determining that a condition for initiating the EDT is satisfied, based on the information representing that the EDT is allowed, by comparing the threshold for the EDT with a size of the uplink data for transmission;
   transmitting a random access preamble which is configured for the EDT, to the BS;
   receiving a random access response message from the BS;
   in response to the random access response message, transmitting a first RRC message including the uplink data to the BS during the random access procedure; and
   in response to the first RRC message, receiving a second RRC message related to a success of the EDT, from the BS,
   wherein the RRC idle state is maintained by the UE based on the second RRC message related to the success of the EDT.

2. The method of claim 1, wherein the size of the uplink data for transmission is lower than the threshold for the EDT.

3. The method of claim 1, wherein the threshold for the EDT is a threshold related to the size of the uplink data for the EDT.

4. The method of claim 1, wherein the size of the uplink data is a data size in a layer 2 including a medium access control (MAC) layer.

5. The method of claim 1, wherein the threshold for the EDT is a threshold related to delay requirement for the EDT.

6. The method of claim 5, further comprising:
   determining whether or not a condition for initiating the EDT is satisfied, by comparing the threshold for the EDT with the delay requirement of the uplink data.

7. The method of claim 6, wherein the UE determines that the condition for initiating the EDT is satisfied, when the delay requirement of the uplink data is lower than the threshold for the EDT.

8. The method of claim 6, wherein the UE determines that the condition for initiating the EDT is not satisfied, when the delay requirement of the uplink data is higher than the threshold for the EDT.

9. The method of claim 1, wherein the size of the uplink data for transmission is uplink data available for transmission plus MAC header.

10. The method of claim 1, wherein the UE is a Narrow Band Internet of Things (NB-IoT) UE.

11. The method of claim 1, wherein the UE communicates with at least one of a mobile terminal, a network or autonomous vehicles other than the UE.

12. A user equipment (UE) transmitting uplink data during a random access procedure in a wireless communication, the UE comprising:
- at least one transceiver;
- at least one processor; and
- at least one computer memory operably connectable to the at least one processor and storing instructions that, when executed, cause the at least one processor to perform operations comprising:
- receiving system information including (i) a threshold for early data transmission (EDT) and (ii) information representing that the EDT is allowed, from a base station (BS);
- determining that a condition for initiating the EDT is satisfied, based on the information representing that the EDT is allowed, by comparing the threshold for the EDT with a size of the uplink data for transmission;
- transmitting a random access preamble which is configured for the EDT, to the BS;
- receiving a random access response message from the BS;
- in response to the random access response message, transmitting a first RRC message including the uplink data to the BS during the random access procedure; and
- in response to the first RRC message, receiving a second RRC message related to a success of the EDT, from the BS,
- wherein the RRC idle state is maintained by the UE based on the second RRC message related to the success of the EDT.

* * * * *